United States Patent [19]
Crosson, Jr.

[11] Patent Number: 5,739,491
[45] Date of Patent: Apr. 14, 1998

[54] LANE CHANGER APPARATUS

[76] Inventor: Oliver J. Crosson, Jr., 2205 Belegarde, Bay City, Tex. 77414-8509

[21] Appl. No.: 622,577

[22] Filed: Mar. 25, 1996

[51] Int. Cl.$^6$ .............................. B60R 27/00; H01H 3/16
[52] U.S. Cl. .................... 200/61.54; 200/61.34; 200/61.35
[58] Field of Search ................ 200/6 R, 61.27, 200/61.34, 61.39, 61.54, 61.35

[56] References Cited

U.S. PATENT DOCUMENTS

| | | | |
|---|---|---|---|
| 4,352,401 | 10/1982 | Vitaloni | 180/90 |
| 5,030,802 | 7/1991 | Noro | 200/61.27 |

*Primary Examiner*—Peter S. Wong
*Assistant Examiner*—Rajnikant B. Patel
*Attorney, Agent, or Firm*—Michael I. Kroll

[57] ABSTRACT

A lane changer apparatus (10) in a motor vehicle (12) comprising a structure (14) built into a steering wheel (16) on a steering column (18) in the motor vehicle (12), for activating left turn signal lights on the motor vehicle (12). The left turn activating structure (14) is accessible to a left thumb on a left hand of a driver of the motor vehicle (12). Another structure (20) is also built into the steering wheel (16) on the steering column (18) in the motor vehicle (12), for activating right turn signal lights on the motor vehicle (12). The right turn activating structure (20) is accessible to a right thumb on a right hand of the driver of the motor vehicle (12), so as to enable the eyes of the driver to be free to look quickly into all mirrors (22) in the motor vehicle (12) and see if any other motor vehicles are nearby when changing lanes.

5 Claims, 2 Drawing Sheets

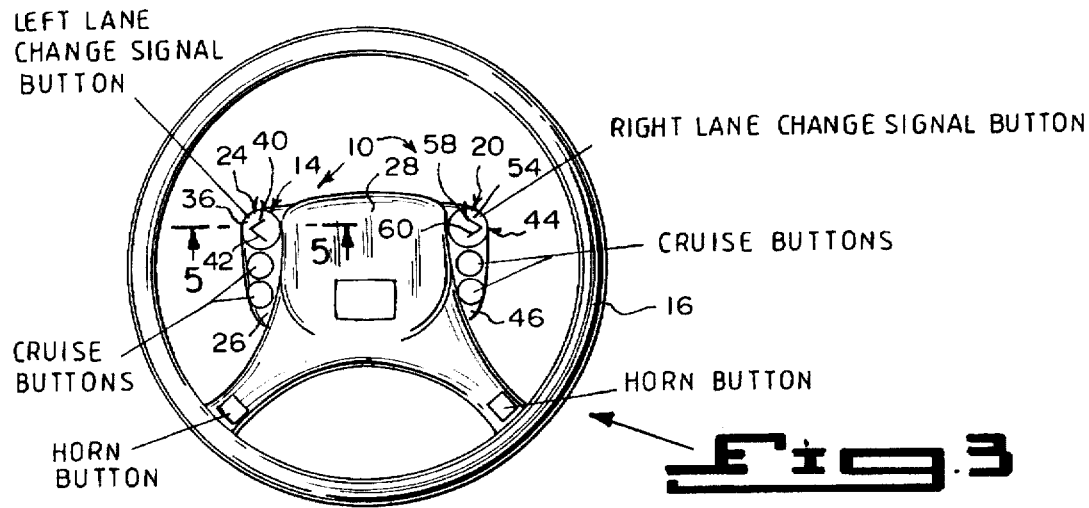
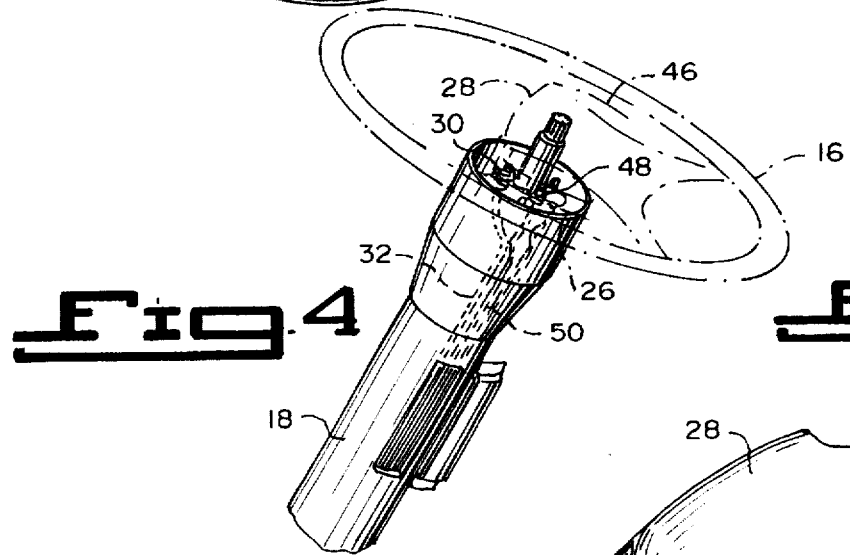
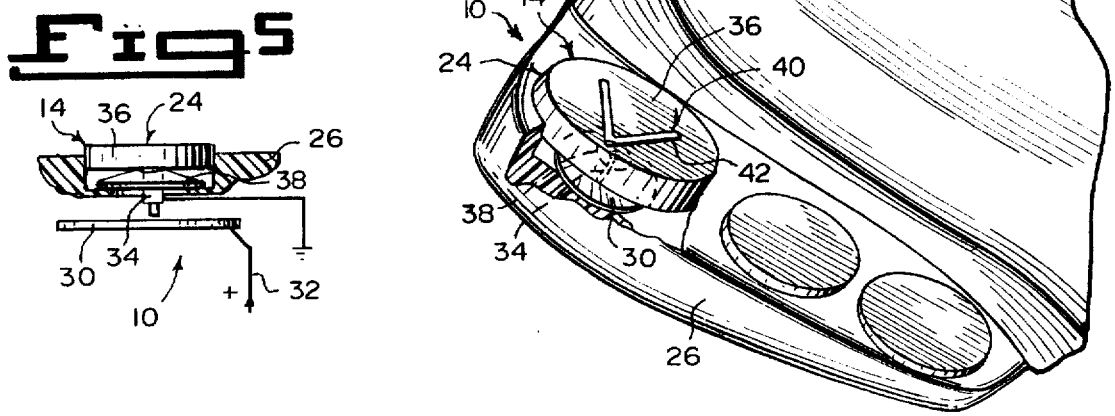

LANE CHANGER APPARATUS

BACKGROUND OF THE INVENTION

1. Field of the Invention

The instant invention relates generally to directional signal switches and more specifically it relates to a lane changer apparatus.

2. Description of the Prior Art

Numerous directional signal switches have been provided in prior art that are adapted to indicate which way motor vehicles are turning by illuminating right or left turn signal lights operated by activating levers in the motor vehicles. While these units may be suitable for the particular purpose to which they address, they would not be as suitable for the purposes of the present invention as heretofore described.

SUMMARY OF THE INVENTION

A primary object of the present invention is to provide a lane changer apparatus that will overcome the shortcomings of the prior art devices.

Another object is to provide a lane changer apparatus in which the directional signal switch in a steering column in a motor vehicle is replaced by left and right lane change signal button switches mounted on the steering wheel.

An additional object is to provide a lane changer apparatus in which the two lane change signal button switches are easily accessible to the right and left thumbs of the driver of the motor vehicle, so that the eyes of the driver will be free to look quickly into all mirrors to see if any other motor vehicles are nearby when changing lanes.

A further object is to provide a lane changer apparatus that is simple and easy to use.

A still further object is to provide a lane changer apparatus that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 3 is an elevational view taken in the direction of arrow 3 in FIG. 2.

FIG. 4 is a perspective view taken in the direction of arrow 4 in FIG. 2 with the steering column broken away and the steering wheel shown in phantom.

FIG. 5 is an enlarged cross sectional view taken a long line 6—6 in FIG. 3, showing the left lane change signal button switch in greater detail.

FIG. 6 is an enlarged perspective view of the area indicated by arrow 6 in FIG. 2, with parts broken away and in section.

Similar reference characters denote corresponding features consistently throughout the attached drawings.

DETAILED DESCRIPTION OF THE PREFERRED EMBODIMENTS

Figure 1:
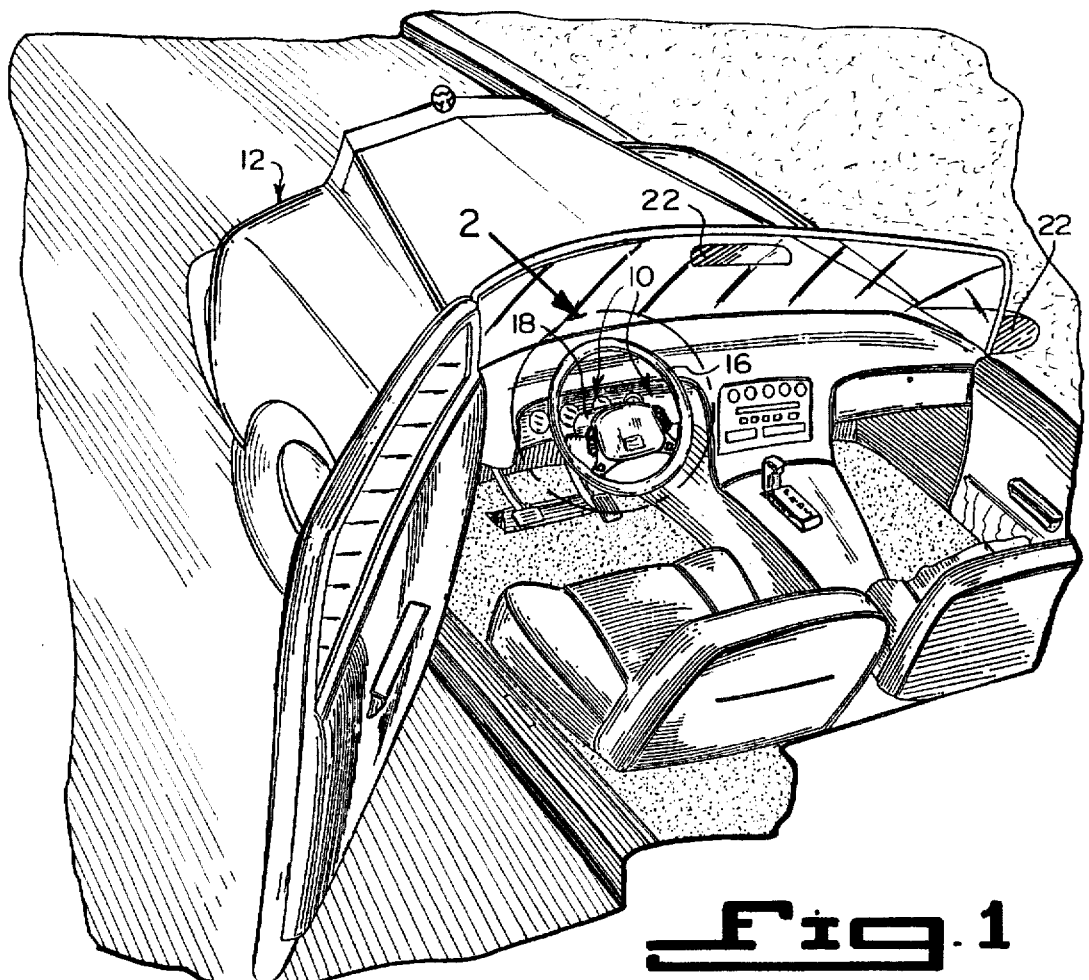
FIG. 1 is a perspective view of a motor vehicle with the instant invention installed within a steering wheel.
Figure 2:
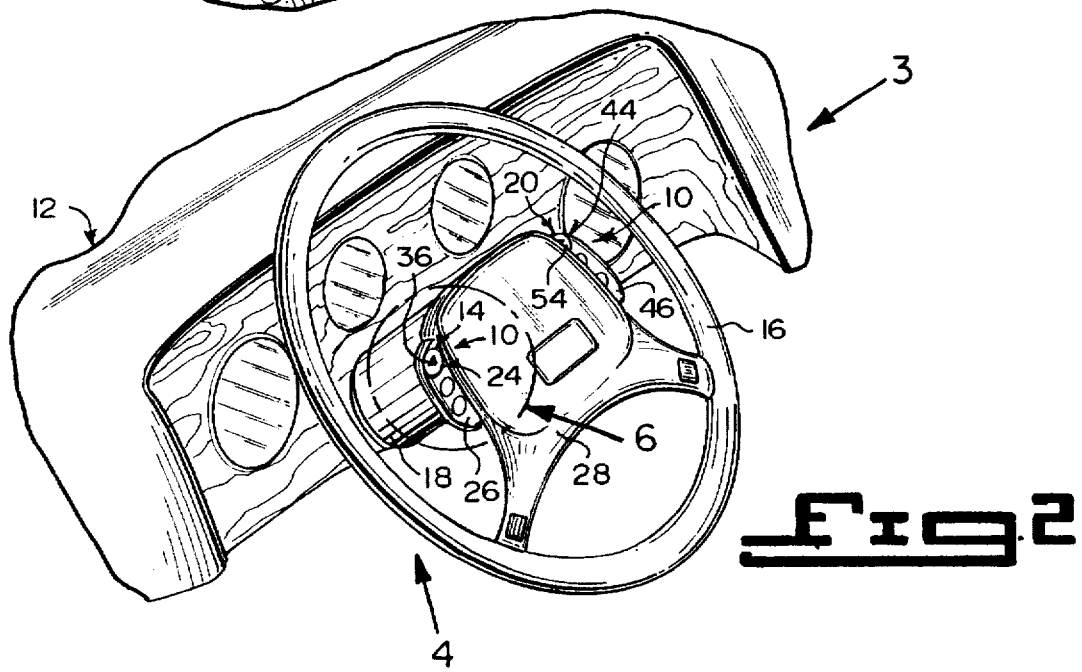
FIG. 2 is an enlarged perspective view of the area indicated by arrow 2 in FIG. 1.

Turning now descriptively to the drawings, in which similar reference characters denote similar elements throughout the several views, FIGS. 1 through 6 illustrates a lane changer apparatus 10 in a motor vehicle 12 comprising a structure 14 built into a steering wheel 16 on a steering column 18 in the motor vehicle 12, for activating left turn signal lights on the motor vehicle 12. The left turn activating structure 14 is accessible to a left thumb on a left hand of a driver of the motor vehicle 12.

Another structure 20 is also built into the steering wheel 16 on the steering column 18 in the motor vehicle 12, for activating right turn signal lights on the motor vehicle 12. The right turn activating structure 20 is accessible to a right thumb on a right hand of the driver of the motor vehicle 12, so as to enable the eyes of the driver to be free to look quickly into all mirrors 22 in the motor vehicle 12 and see if any other motor vehicles are nearby when changing lanes.

The left turn activating structure 14 is a left lane change signal button switch assembly 24. The left lane change signal button switch assembly 24 includes a left flange member 26 extending from a left side of a hub pad 28 on the steering wheel 16. A left stationary contact plate 30 mounted within the left flange member 26 is electrically connected to a left turn wire 32 within the steering column 18. A left movable contact pin unit 34 is positioned over the left stationary contact plate 30. A left button 36 is positioned over the left movable contact pin unit 34. When the left button 36 is depressed by the left thumb of the driver, the left movable contact pin unit 34 will engage with the left stationary contact plate 30, to close a left turn electrical circuit to cause the left turn signal lights to flash.

The left movable contact pin unit 34 contains a left belleville spring 38 located against a bottom surface of the left button 36. When the left button 36 is released by the left thumb of the driver, the left belleville spring 38 will cause the left button 36 to return to its original position in the left flange member 26. This allows the left movable contact pin unit 34 to disengage away from the left stationary contact plate 30 to open the left turn electrical circuit.

The left button 36 includes indicia 40 thereon to indicate to the driver that the left button 36 is for a left turn signal. The indicia 40 on the left button 36 is a left arrow 42 pointing to a left side of the motor vehicle 12.

The right turn activating structure 20 is a right lane change signal button switch assembly 44. The right lane change signal button switch assembly 44 includes a right flange member 46 extending from a right side of the hub pad 28 on the steering wheel 16. A right stationary contact plate 48 mounted within the right flange member 46 is electrically connected to a right turn wire 50 within the steering column 18. A right movable contact pin unit 52, not shown but similar to 34, is positioned over the right stationary contact plate 48. A right button 54 is positioned over the right movable contact pin unit 52. When the right button 54 is depressed by the right thumb of the driver, the right movable contact pin unit 52 will engage with the right stationary contact plate 48, to close a right turn electrical circuit to cause the right turn signal lights to flash.

The right movable contact pin unit 52 contains a right belleville spring 56, not shown but similar to 38, located against a bottom surface of the right button 54. When the right button 54 is released by the right thumb of the driver, the right belleville spring 56 will cause the right button 54 to return to its original position in the right flange member 46. This allows the right movable contact pin unit 52 to disengage away from the right stationary contact plate 48, to open the right turn electrical circuit.

The right button 54 includes indicia 58 thereon, to indicate to the driver that the right button 54 is for a right turn signal. The indicia 58 on the right button 54 is a right arrow 60 pointing to a right side of the motor vehicle 12.

LIST OF REFERENCE NUMBERS 10 lane changer apparatus
12 motor vehicle
14 left turn activating structure in 16
16 steering wheel on 18
18 steering column in 12
20 right turn activating structure in 16
22 mirror in 12
24 left lane change signal button switch assembly for 14
26 left flange member on 28
28 hub pad on 16
30 left stationary contact plate of 24
32 left turn wire in 18
34 left movable contact pin unit of 24
36 left button of 24
38 left belleville spring of 34
40 indicia on 36
42 left arrow for 40
44 right lane change signal button switch assembly for 20
46 right flange member on 28
48 right stationary contact plate of 44
50 right turn wire in 18
52 right movable contact pin unit of 44
54 right button of 44
56 right belleville spring of 44
58 indicia on 54
60 right arrow for 58

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A lane changer apparatus in a motor vehicle comprising:

a) means built into and rotatable with a steering wheel on a steering column in the motor vehicle, for activating left turn signal lights on the motor vehicle accessible to a left thumb on a left hand of a driver of the motor vehicle as said steering wheel is being turned, said left turn activating means comprising a left turn switch assembly which includes a left flange member extending from a left side of a hub pad on the steering wheel, a left stationary contact plate mounted within said left flange member electrically connected to a left turn wire within the steering column, a left movable contact pin unit positioned over said left stationary contact plate, and a left button positioned over said left movable contact pin unit so that when said left button is depressed by the left thumb of the driver the left movable contact pin unit will engage with said left stationary contact plate to close a left turn electrical circuit to cause the left turn signal lights to flash; and b) means built into and rotatable with the steering wheel on the steering column in the motor vehicle, for activating right turn signal lights on the motor vehicle accessible to a right thumb on a right hand of the driver of the motor vehicle as said steering wheel is being turned, said right turn activating means comprising a right lane change signal button switch assembly which includes a right flange member extending from a right side of the hub pad on the steering wheel, a right stationary contact plate mounted within said right flange member electrically connected to a right turn wire within the steering column, a right movable contact pin unit positioned over said right stationary contact plate, and a right button positioned over said right movable contact pin unit so that when said right button is depressed by the right thumb of the driver said right movable contact pin unit will engage with said right stationary contact plate to close a right turn electrical circuit to cause the right turn signal lights to flash.

2. A lane change apparatus as recited in claim 1, wherein said left movable contact pin unit includes a left belleville spring located against a bottom surface of said left button, so that when said left button is released by the left thumb of the driver, said left belleville spring will cause said left button to return to its original position in said left flange member, to allow said left movable contact pin unit to disengage away from said left stationary contact plate to open the left turn electrical circuit.

3. A lane changer apparatus as recited in claim 2, wherein said left button includes indicia thereon to indicate to the driver that said left button is for a left turn signal.

4. A lane changer apparatus as recited in claim 1, wherein said right movable contact pin unit includes a right belleville spring located against a bottom surface of said right button, so that when said right button is released by the right thumb of the driver, said right belleville spring will cause said right button to return to its original position in said right flange member, to allow said right movable contact pin unit to disengage away from said right stationary contact plate to open the right turn electrical circuit.

5. A lane change apparatus as recited in claim 4, wherein said right button includes indicia thereon to indicate to the driver that said right button is for a right turn signal.

\* \* \* \* \*